(12) United States Patent
Warbus et al.

(10) Patent No.: US 6,690,479 B1
(45) Date of Patent: Feb. 10, 2004

(54) PROCESS AND CIRCUIT FOR INITALIZING A PRINTER OR COPYING MACHINE

(75) Inventors: Volker Warbus, Oberhaching (DE); Karola Scheidig, Pliening (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/423,159

(22) PCT Filed: Apr. 30, 1998

(86) PCT No.: PCT/EP98/02574
§ 371 (c)(1),
(2), (4) Date: Feb. 24, 2000

(87) PCT Pub. No.: WO98/49606
PCT Pub. Date: Nov. 5, 1998

(30) Foreign Application Priority Data

Apr. 30, 1997 (DE) .......................................... 197 18 416

(51) Int. Cl.$^7$ ............................................... G06K 15/00
(52) U.S. Cl. ...................................... 358/1.13; 358/1.14
(58) Field of Search .......................... 358/1.1, 1.4, 1.6, 358/1.9, 1.12, 1.13, 1.14, 1.15; 399/38, 75, 16; 715/542; 714/46; 347/7, 14, 57, 60

(56) References Cited

U.S. PATENT DOCUMENTS

| | | | | |
|---|---|---|---|---|
| 4,161,277 A | * | 7/1979 | Steiner | 714/46 |
| 5,050,098 A | | 9/1991 | Brown, III et al. | 358/1.1 |
| 5,075,841 A | | 12/1991 | Kaneko | 714/36 |
| 5,317,367 A | | 5/1994 | Pierce et al. | 399/38 |
| 5,784,080 A | * | 7/1998 | Nitta et al. | 347/23 |
| 6,022,093 A | * | 2/2000 | Arai et al. | 347/14 |
| 6,104,886 A | * | 8/2000 | Suzuki et al. | 396/429 |
| 6,504,619 B1 | * | 1/2003 | Kageyama et al. | 358/1.14 |

FOREIGN PATENT DOCUMENTS

EP    0 476 681    3/1992

OTHER PUBLICATIONS

Japanese Abstract, 62184477, Dec. 8, 1987.
Japanese Abstract, 05281809, Oct. 29, 1993.

* cited by examiner

*Primary Examiner*—Gabriel Garcia
(74) *Attorney, Agent, or Firm*—Schiff Hardin & Waite

(57) ABSTRACT

A process and circuit for a printer or copier has control data loaded into a working memory of a control unit. The control data is compared to predetermined values which correspond to a predetermined acceptable control data range. An error signal is generated when the control data is outside the acceptable range.

12 Claims, 6 Drawing Sheets

PROCESS AND CIRCUIT FOR INITALIZING A PRINTER OR COPYING MACHINE

BACKGROUND OF THE INVENTION

1. Field of the Invention

The present invention is directed to a method for initializing a printer or copier as well as to a circuit suitable for the implementation of the method.

2. Description of the Related Art

For placing electronic printers or copiers into operation, it is necessary to initialize these devices. The various components of the printer or copier are thereby placed into defined statuses in order to achieve reproducible print outputs given optimally constant quality. Given electrophotographic high-performance printing systems, a few dozen units and sub-units must be initialized during the course of such initialization procedures, for example transport motors, voltage sources, thermal fixing devices, etc.

Published international patent application WO 96/02872A discloses such an electrophotographic high-performance printing system having a plurality of units. U.S. Pat. No. 5,050,098 discloses a method for initializing printers.

The parameters for initializing a printer or copier can vary dependent on the equipment of the units or dependent on the desired print images of the user. In high-performance printing systems, for example, the horizontal shift of the print image or the toner type utilized can be set in terms of color, recording density or the like during the course of the initialization.

During the course of a printer initialization, specific initialization parameters are read from a non-volatile memory (for example, from an EPROM (erasable programable read only memory) or from an NVRAM (non-volatile random access memory)) and are written into a volatile main memory of a device controller. It can thereby occur that invalid data are written into the main memory during the course of the initialization, for example because data from the non-volatile memory have been lost or falsified or because errors occur during the course of the data transmission. When a high-performance printing system is operated with such incorrect initialization parameters, then errors usually occur during printing that, under certain circumstances, lead to the outage of assemblies or even to the destruction of complex, high-quality units.

For example, an inadmissible toner type in an electrophotographic high-performance printing system can lead to a defect in the developer station.

Given a printing system having a plurality of units, it is necessary to transfer a multitude of data into a main memory during the course of the initialization process.

Due to the multitude of data and the complexity of the inter-engaging procedures in such a printer, malfunctions can occur more frequently during the course of the initialization than given simpler printers.

SUMMARY OF THE INVENTION

It is therefore an object of the invention to design the initialization process of a complexly constructed printer or copier as dependably as possible so that malfunctions of the printer are largely avoided.

This and other objects and advantages are achieved by the method for initializing a printer or copier, control data being loaded into a main memory of a device controller that comprises a device controller controller, the device controller transmits the control data into a comparison means that contains a memory with comparison values that respectively correspond to a predetermined, allowable data range of the control data, and the comparison means in a separate controller compares the control data to the comparison values and generates an error signal is when a control datum lies outside the permitted data range. The invention also provides a circuit for initializing a printing system or copying system, control data being loaded into a volatile main memory of a device controller that contains a device controller controller, including a memory for comparison values and a means connected to the device controller for comparing the control data to the comparison values that comprises a separate controller and that generates an error signal when control data lie outside a permitted data range prescribed by the comparison values.

Inventively, the data loaded into the main memory of the apparatus controller of a printer or copier are checked before the printer or copier begins operating. To that end, the control data are compared in a unit comprising a separate controller to comparison values that respectively correspond to a predetermined, permissible data range. When a control datum lies outside the data range permitted for this type of data, then an error signal is generated that prevents the printer or copier from entering into operation with this false datum.

A unit is preferably provided that, in case of an incorrect control datum, undertakes a correction of the incorrect data in specific data sets. This correction can ensue, for example, in that standard values that are stored in a non-volatile memory are transferred into the main memory of the device controller instead of the incorrect, transmitted control data.

In a preferred exemplary embodiment, the printer or copier comprises a device controller that is connected to a control panel unit. During the course of the initialization procedure, the control data are transmitted from the device controller onto the control panel unit. The control panel unit then checked the control data for their plausibility, i.e. to see whether the control data lie in a respectively allowed data range. When an error is thereby found, then the control panel unit replaces the incorrect control data with corresponding, predetermined standard values. In addition, an error message can be output on an output means such as a monitor, an error log, an error log data file or the like.

Given such an arrangement, the control data, the comparison values and/or the standard values can be respectively optionally directly connected to the device controller or directly to the control panel unit. They can also be deposited on a common, non-volatile memory. Finally, it can be advantageous to mirror these data in an additional memory, i.e. to again secure the data of the printer or copier against data loss.

BRIEF DESCRIPTION OF THE DRAWINGS

Exemplary embodiments of the invention are described below.

DETAILED DESCRIPTION OF THE
PREFERRED EMBODIMENTS

Figure 6:
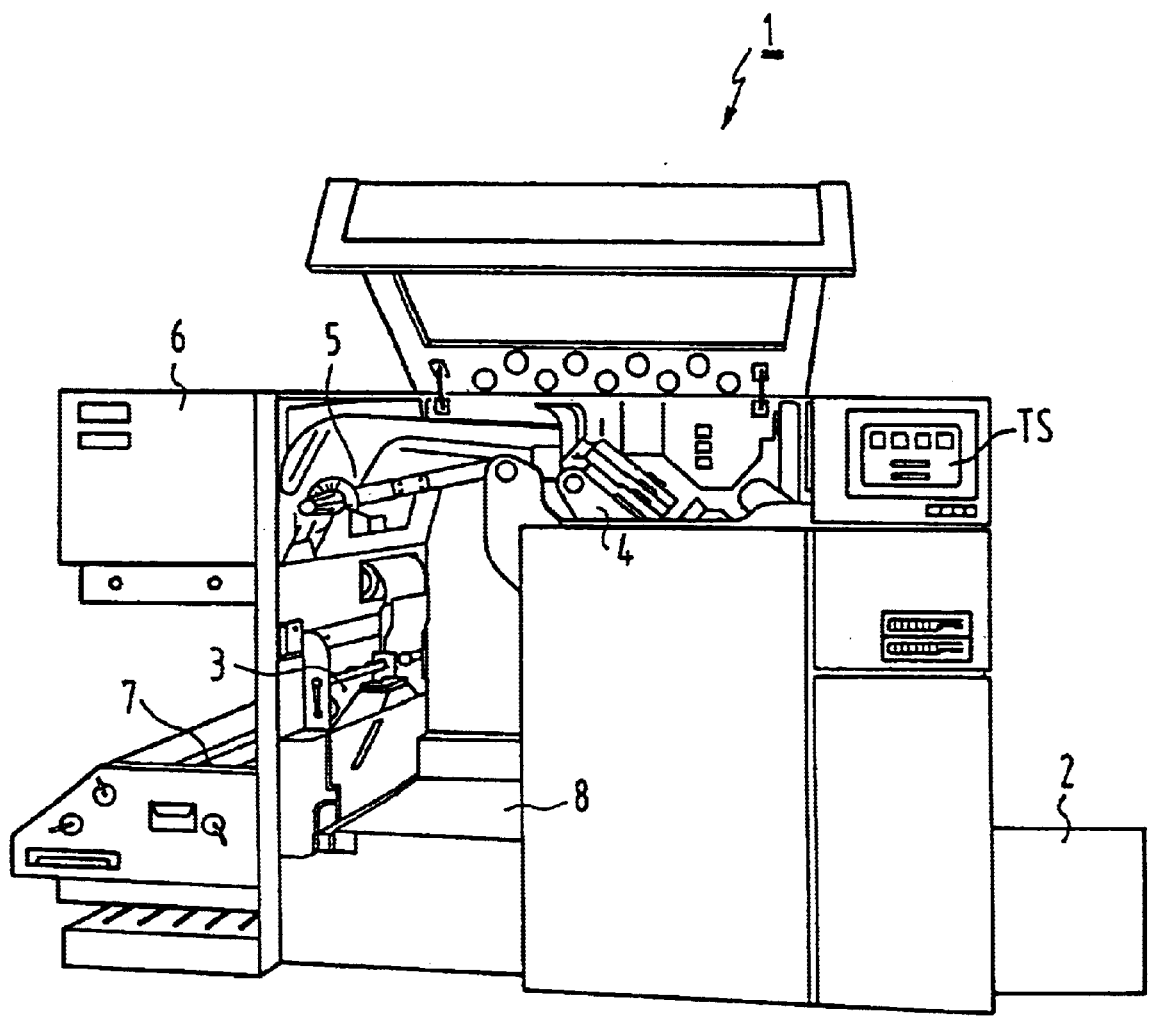
FIG. 6 is a perspective view which shows a high performance printer of the prior art.

A high-performance printer 1 as shown in FIG. 6 comprises a paper supply 2 from which paper is taken and transported to a printing unit 4 via a paper feeder 3. In the printing unit 4, the information to be printed are transferred onto the paper 8 via an electrophotographic process. The paper charged with toner is thereby handed over from a transverse station 5 to a fixing station 6 in which the toner is fixed on the paper with heat. Finally, the printed paper is stacked on a deposit station 7 and can be removed for further processing. The operation of the printer ensues via a touch screen TS, whereby the operator can input information directly at the picture screen by touching the picture screen surface.

Figure 1:
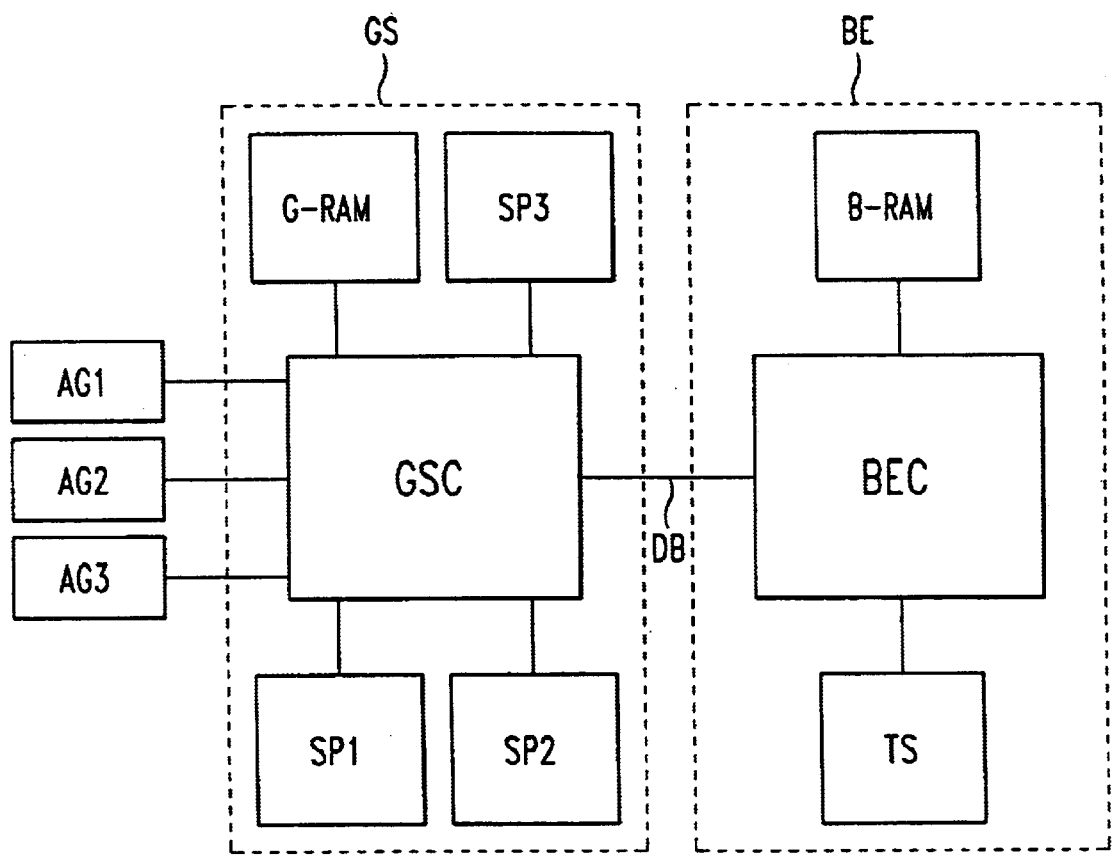
FIG. 1 is a circuit diagram of a first circuit version of a printer controller.

FIG. 1 shows electronic components for initializing a printing system. The core is thereby formed by a controller GSC of a device controller GS. It is connected to various electronic unit controls AG1, AG2 and AG3 that respectively drive the various units of the printer. After the printer is turned on, a software program is loaded into the main memory G-RAM of the device controller GS. This program controls the further executions of the device controller. The loading can ensue from one of the non-volatile memories SP1, SP2 or SP3 of the device controller GS. These three memories SP1, SP2, and SP3 can be arranged spatially separated from one another or can also be different memory areas of the same memory element, for example non-volatile RAMs (what are referred to as non-volatile RAMs or, respectively, NV-RAMs, E-EPROMS or can be hard disk memories as well.

During or after the loading of the operating program into the main memory G-RAM, the controller of the device controller GS also activates a control panel unit BE. To that end, a control panel software program is loaded into the main memory B-RAM of the control panel unit BE. This in turn activates the touch screen TS. A controller BEC of the control panel unit monitors the executive sequences within the control panel unit BE.

The data transmission between the device controller GS and the control panel unit BE ensues via data bus DB to which the two controllers GSC and BEC are connected.

During the course of the start of the device controller, whereby the operating program of the device controller GS is loaded into the main memory G-RAM, those control data that are required in order to drive the various unit controls (AG1, AG2, etc.) are also loaded into the main memory G-RAM. The control data are taken from the memory SP1. During the course of the start of the control panel unit BE, the control data are then transferred from the main memory G-RAM of the device controller GS to the main memory B-RAM of the control panel unit BE. The control panel unit BE subsequently checks whether these data respectively lie in an allowed value range. To that end, it reads comparison values from the memory ST3. The comparison values are thereby limit values of allowable value ranges in the respective control data. When the control panel unit BE then finds that a control datum deriving from the memory SP1 lies outside a value range allowed for this datum, then the control panel unit BE generates an error signal. Subsequently, an attempt is made to replace the data on the basis of default values from the memory ST2 and to return the replaced data to the main memory G-RAM of the device controller GS.

Figure 2:
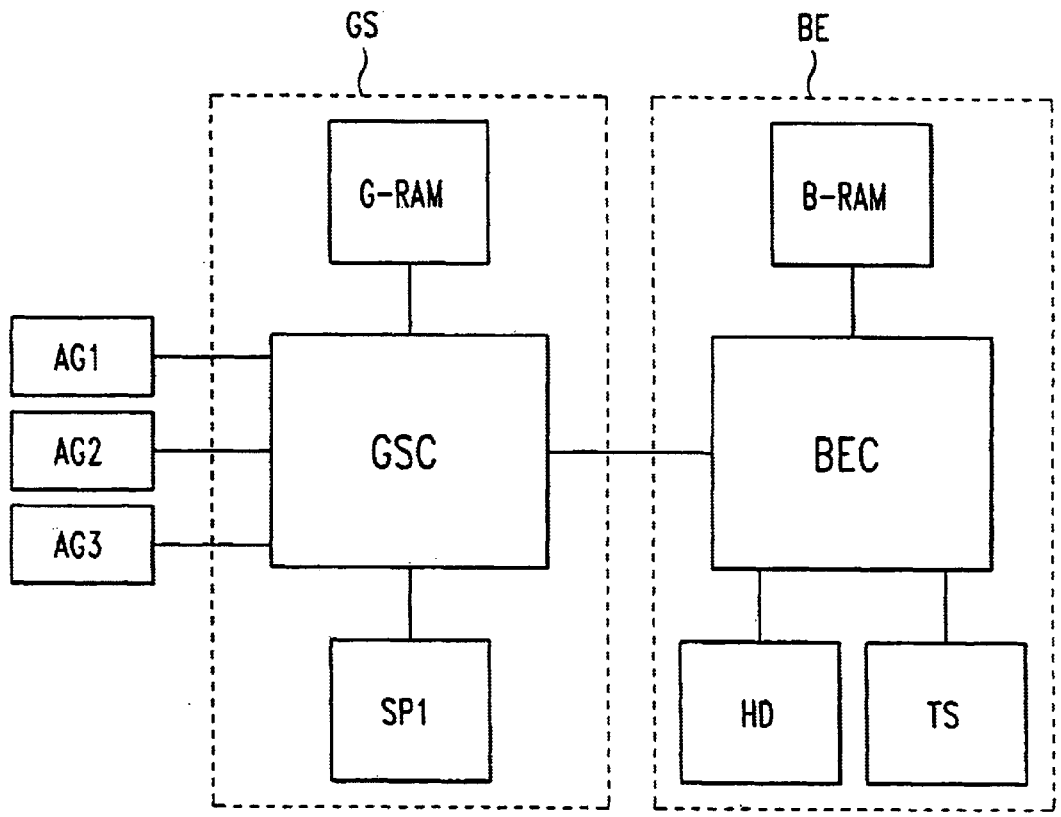
FIG. 2 is a circuit diagram of a second circuit version of a printer controller.

FIG. 2 shows a somewhat modified embodiment of the control unit of FIG. 1. Given the version shown in FIG. 2, the data for the default values and for the comparison values that limit the permitted data ranges are stored in a non-volatile memory that is directly connected to the controller BEC of the control panel unit BE. As a result thereof, the control panel unit BE is an autonomous system independent from the rest of the device controller GS. For example, it can be presented by a PC with microprocessor, hard disk, touch screen and main memory. This PC is to be connected to the device controller GS via a parallel or serial interface.

Figure 3:
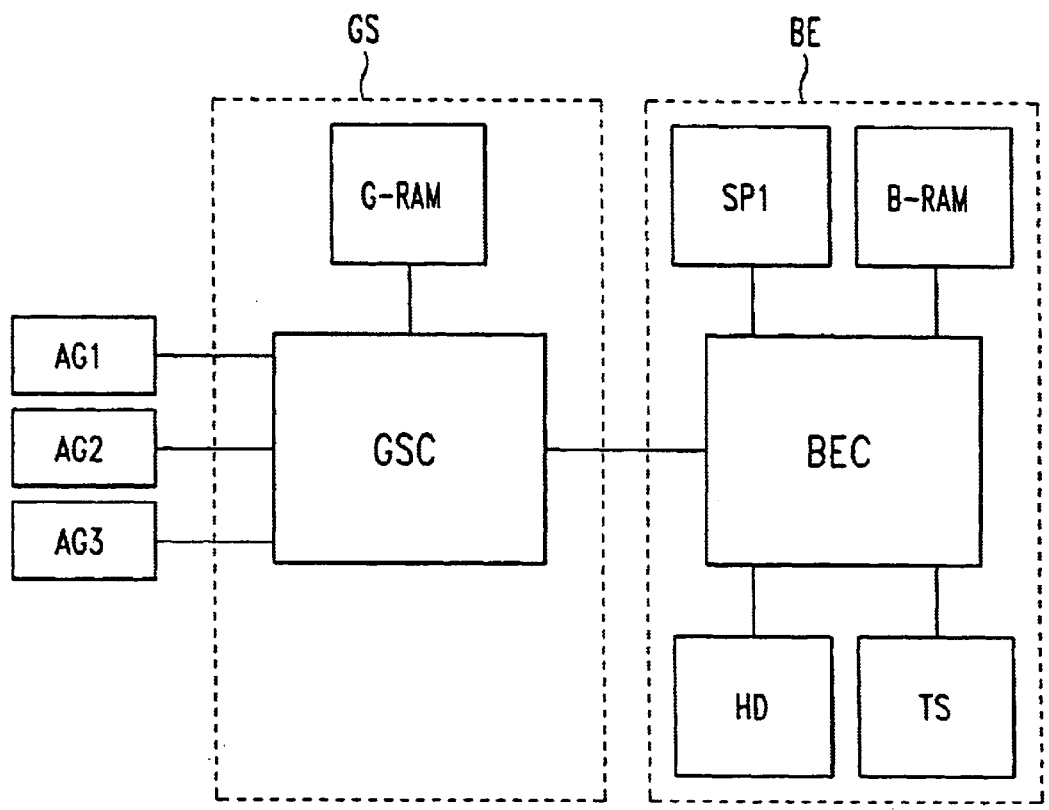
FIG. 3 is a circuit diagram of a third circuit version of a printer controller.

In addition to the embodiment shown in FIG. 2, the memory 1 for the control data is arranged in the control panel unit BE in FIG. 3. These data are then supplied from the control panel unit to the device controller during the course of the initialization.

Figure 4:
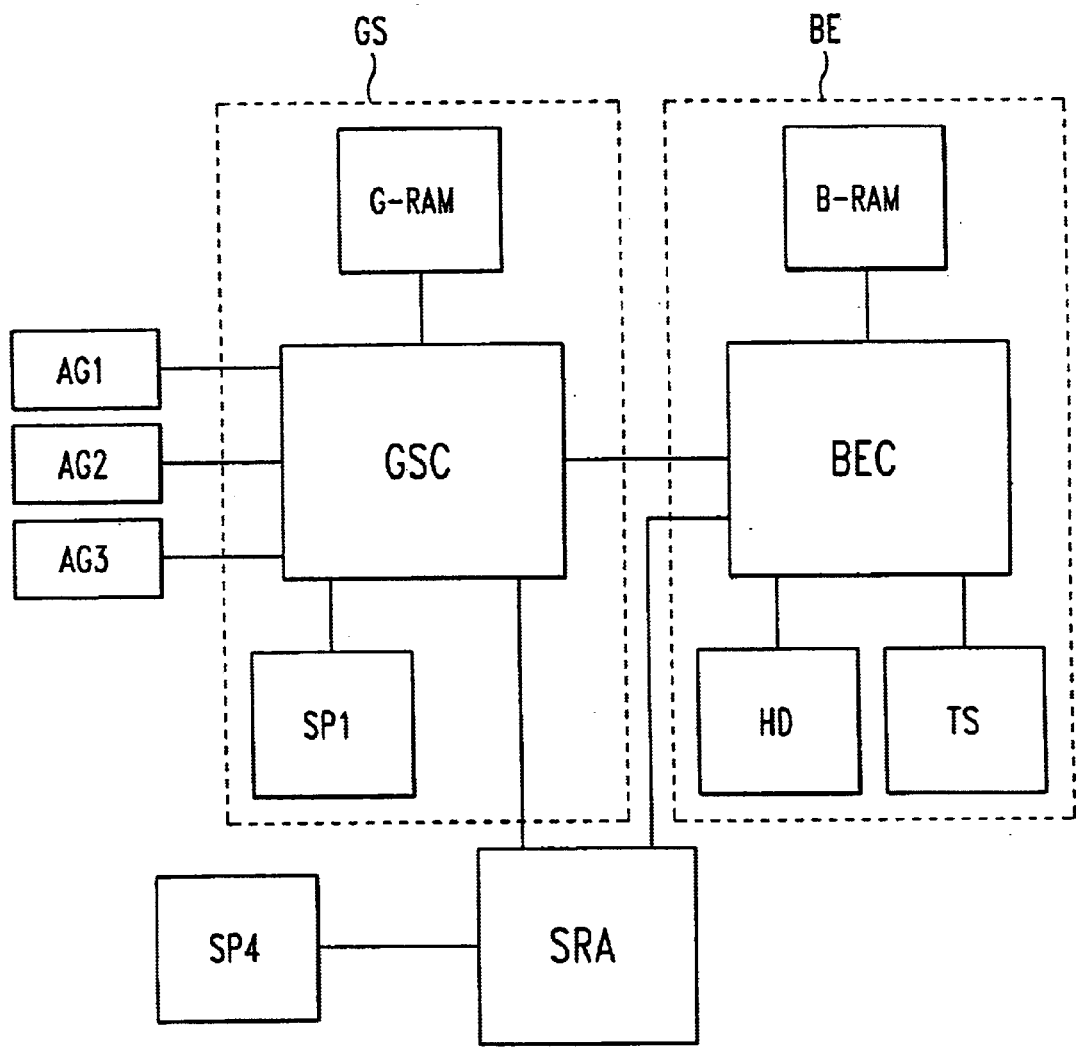
FIG. 4 is a circuit diagram of a fourth circuit version of a printer controller.

FIG. 4 shows a further embodiment of a system for initializing a printer. A device controller GS and control panel unit BE are essentially connected in the way shown in FIG. 2. Added thereto, however, is a unit SRA that is connected both to the device controller GS as well as to the control panel unit BE, that comprises a non-volatile memory SP4 and is a controller for a character generator. The memory SP4 can be employed as protection memory for data that are stored in the device controller GS and/or in the control panel unit BE in the memories SP1 or, respectively, SHD. As a result of this additional protection, the data can be mirrored, a review or, respectively, data matching can be implemented again. What is thereby effected is that the data loaded into the device controller GS for initializing the units AG1 through AG3 exhibit permitted values with high dependability. A high data security can be achieved particularly in that the various memories of the units GS, BE and/or SRA are accommodated spatially separated in the printer.

Figure 5:
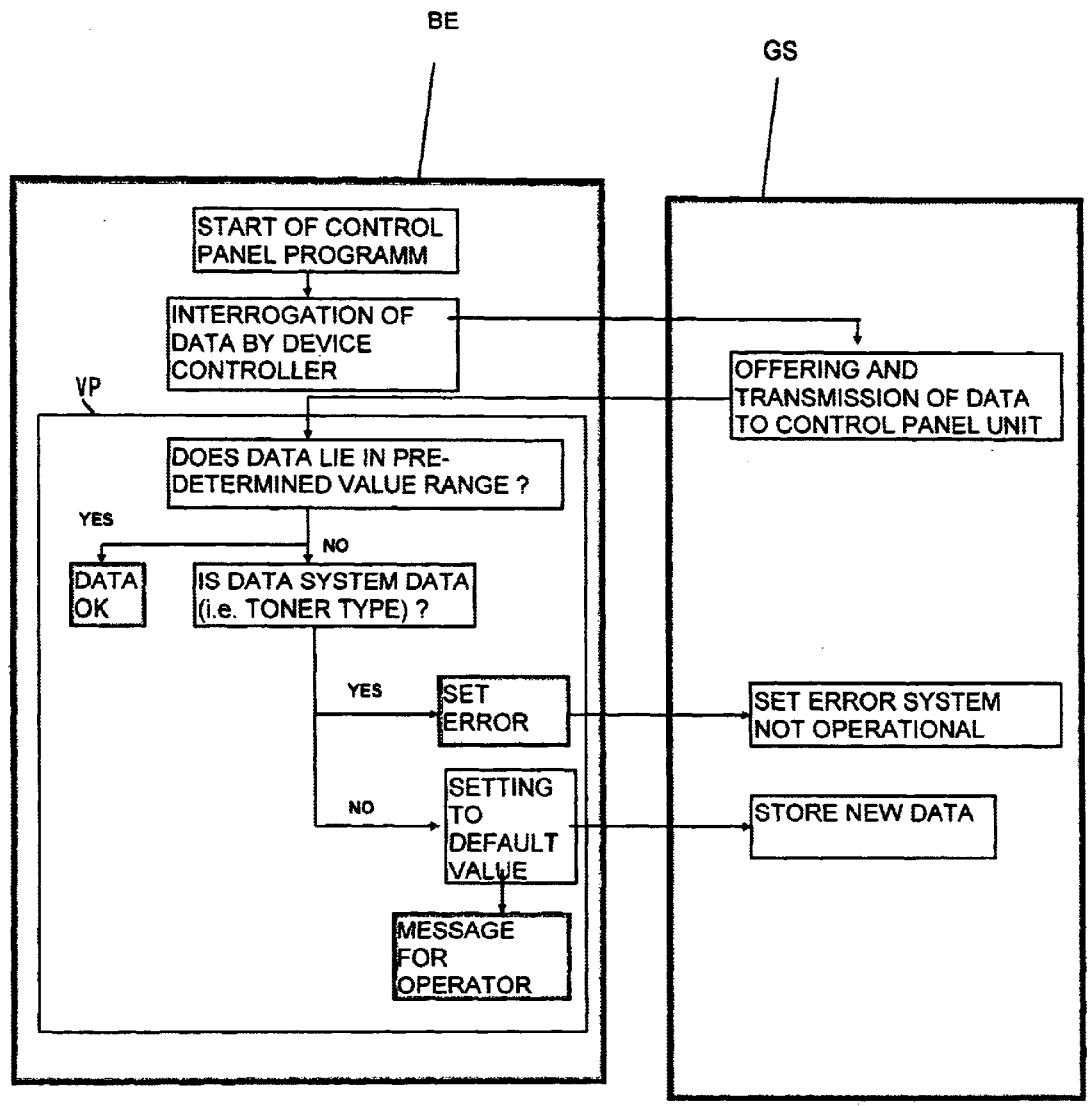
FIG. 5 is a circuit diagram of shows a flow chart for checking the control data.

FIG. 5 shows a flow chart from which the initialization process becomes clear. After the main device controller GS has loaded its operating program, a control panel program is loaded into the memory B-RAM of the control panel unit BE. This program interrogates the data of the device controller GS and contacts the controller GSC of the device controller GS for this purpose. The controller GSC makes the control data that are to be employed for the various units available to the control panel unit BE. A comparison procedure VP of the control panel program then compares whether the control data made available by the device controller GS lie in the predetermined, allowable value range. When this is the case, then the data are released (ok). When, however, the data do not lie in the predetermined, allowed value range, then a check is initially carried out to see whether the data relate to especially important system data. Such important system data, for example the particular about a type of toner present in the printer, cannot be replaced without further ado. In these cases, an error message is therefore generated and displayed on the touch screen picture screen. Over and above this, an error signal is communicated to the device controller GS that prevents the overall system from being placed in operation. This reliably prevents the printer from being operated with incorrect system data that could lead to a serious malfunction or even to a destruction of unit components. Additionally, it can be provided to document the error on an error log or in a history data file of the printer.

When, for example, the datum for a toner type that has been set in the printer is set to an impermissible value, then the control panel unit sets an error that prevents the start of printing. Due to its great significance, a type of toner cannot be automatically set to a standard value (default). In this case, a service technician must therefore reset the correct value.

When, by contrast, the data that outside the predetermined, allowed value range are less important data that can be automatically corrected or, respectively, whose incorrect setting deteriorates the over all function of the printer, then such a datum is set to a standard value (default). Additionally, a message for the operator is derived from the error signal, from which the operator can recognize the new value that has been set on the picture screen. The new data are then transferred to the device controller, particularly into the main memory G-RAM thereof.

One example of such a less important data set is the setting for the horizontal shift of a print image. Assuming that a horizontal shift of the print image that has been set has changed and lies outside the permitted range, then the print image is printed onto an undefined region, possibly even off the paper. Such a print job would have to be completely discarded. An automatic setting to a prescribed value (default), for example to a shift of zero, assures that the paper receives the print image in any case. On the basis of a message for the operator and, potentially, a symbolic marking, the possibility can then be established of correcting this. It can also be provided in such a correction case to document the error and its correction in an error log and/or in a history data file of the printer.

Exemplary embodiments of the invention have been described. It is thereby clear that modifications can be recited at any time. For example, the comparison values within the control panel unit can be made available from a non-volatile RAM memory (NV-RAM) instead of from a hard disk memory. The invention can also be advantageously employed for copiers and copier systems, high-performance printers and plotters. Both single sheets as well as paper in roll form can be processed in the devices.

Although other modifications and changes may be suggested by those skilled in the art, it is the intention of the inventors to embody within the patent warranted hereon all changes and modifications as reasonably and properly come within the scope of their contribution to the art.

We claim:

1. A method for initializing a printer or copier, comprising the steps of:

loading control data into a main memory of a device controller that includes a controller of said device controller, transmitting said control data by the device controller into a comparison apparatus that contains a memory with comparison values that respectively correspond to a predetermined, allowable data range of the control data, comparing by the comparison apparatus in a separate controller the control data to the comparison values, and generating an error signal when a control datum lies outside the permitted data range.

2. A method according to claim 1, wherein said comparison apparatus is a control panel unit.

3. A method according to claim 2, further comprising the step of:

storing comparison values in a non-volatile data memory of the control panel unit.

4. A method according to claim 2, further comprising the steps of:

generating the error signal by the control panel unit; and returning by the control panel unit control data lying in the permitted data range to the device controller in case of error.

5. A method according to claim 1, further comprising the step of:

allocating respective identifiers to the control data in accord wherewith a decision is made in case of error whether a control datum lying outside the permitted data range is automatically replaced by a default value or only the error signal is output.

6. A method according to claim 1, further comprising the step of:

outputting a signal for blocking the printing process when a specific control datum classified as important for the printing process lies outside respective, allowed data range.

7. A method according to claim 1, further comprising the step of:

employing the method in a high-performance printer.

8. A circuit for initializing a printing system or copying system, comprising:

a device controller having a volatile main memory in which is stored control data that contains a device controller controller, a second memory for comparison values, and a comparing apparatus connected to the device controller for comparing the control data to the comparison values, said comparing apparatus including a separate controller that generates an error signal when control data lie outside a permitted data range prescribed by the comparison values.

9. A circuit according to claim 8, wherein said second memory is a non-volatile memory, and said comparing apparatus includes a control panel unit within which is said second memory.

10. A circuit according to claim 9, wherein said device controller includes a third non-volatile memory for the control data, the volatile main memory of the device controller being connected to accept the control data from the third non-volatile memory; and the control panel unit includes a second volatile main memory connected for transfer of the data from the volatile main memory of the device controller as well as from said second non-volatile memory.

11. A circuit according to claim 9, further comprising:

a further memory connected to the device controller and to the control panel unit in which both the control data contained in the non-volatile memory of the device controller as well as the comparison values stored in the second non-volatile memory are mirrored.

12. A circuit according to claim 8, wherein said circuit is used in a high-performance printing system.

* * * * *

UNITED STATES PATENT AND TRADEMARK OFFICE
CERTIFICATE OF CORRECTION

PATENT NO.     : 6,690,479 B1
DATED          : February 10, 2004
INVENTOR(S)    : Volker Warbus et al.

It is certified that error appears in the above-identified patent and that said Letters Patent is hereby corrected as shown below:

<u>Title page,</u>
Item [54], Title, the word "INITALIZING" please coorect to read
-- INITIALIZING --

Signed and Sealed this

Eighth Day of June, 2004

JON W. DUDAS
*Acting Director of the United States Patent and Trademark Office*